Figure 1:
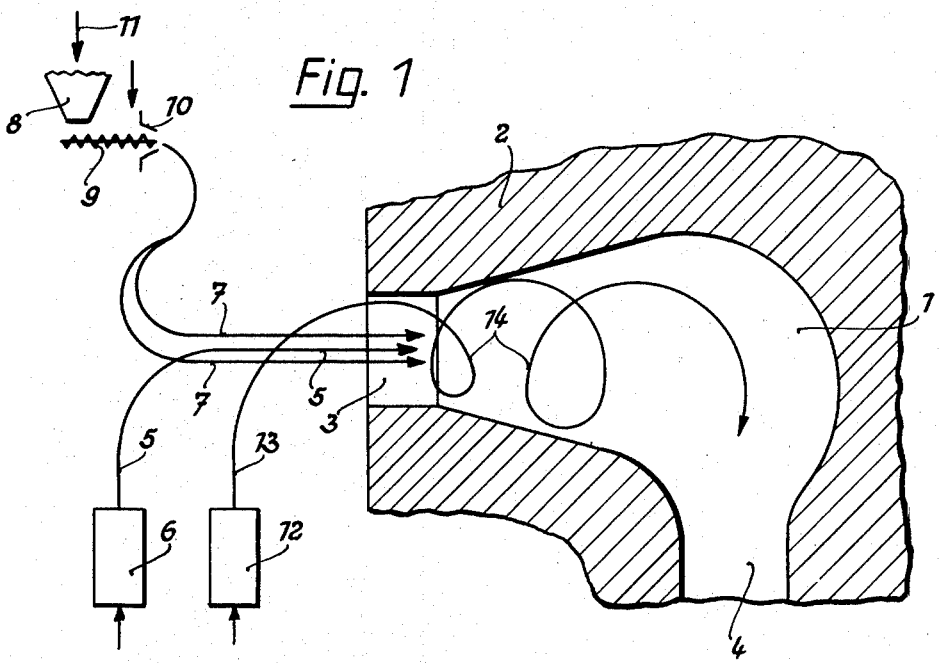

April 13, 1954
J. DANIELS
2,675,295
PROCESS FOR RAPIDLY AND CONTINUOUSLY PERFORMING
A HIGH TEMPERATURE ENDOTHERMIC REACTION
BETWEEN A SOLID AND A GASEOUS REACTANT
Filed May 12, 1950
3 Sheets-Sheet 1

Inventor:
Joseph Daniels
By Cushman, Darby & Cushman
Attys.

Patented Apr. 13, 1954

2,675,295

UNITED STATES PATENT OFFICE 2,675,295

PROCESS FOR RAPIDLY AND CONTINUOUSLY PERFORMING A HIGH TEMPERATURE ENDOTHERMIC REACTION BETWEEN A SOLID AND A GASEOUS REACTANT

Joseph Daniels, Essen, Germany

Application May 12, 1950, Serial No. 161,638

Claims priority, application Germany May 12, 1949

12 Claims. (Cl. 23—1)

The invention relates to the performance of endothermic reactions between solid materials on the one hand and gaseous materials on the other under formation of reaction products which under normal conditions (pressure, temperature) are solid or liquid, i. e. not gaseous.

The designation "gaseous" reaction materials includes in this case both genuine gases and vapours.

Endothermic reactions between solid and gaseous materials have previously been performed by having the solid reaction component with a suitable grain size within an externally heated reaction chamber having the shape of a retort, the gaseous reaction component being conducted through the contents of the reaction chamber which remains stationary. As an example, the conversion of calcium carbide with nitrogen (air) into calcium cyanamide according to the equation $CaC_2 + N_2 = CaCN_2 + C$ will be quoted. In this case the calcium carbide will be arranged in an externally heated and mostly vertical retort and air will be conducted through the unmoved retort contents under simultaneous addition of heat through the retort walls.

The performance of endothermic reactions in conformity with the aforesaid method has the essential disadvantage that only a relatively slow conversion will occur. This is mainly caused by the bad heat transmission from the retort wall to the solid contents of the retort. The temperature of the retort wall must not generally exceed a certain limit and it is impossible to maintain this highest permissible temperature giving the optimum reaction at all points of the retort contents.

Another known method of performing endothermic reactions between solid and gaseous reaction components consists in introducing the solid reaction component into a cylindrical rotary kiln or into another apparatus equipped with mechanical means for revolving the solid reaction component. When using this method the heat transmission from the externally heated wall of the reaction chamber to the solid reaction material will be better than with the first mentioned stationary arrangement of the solid reaction component.

As an example of this method, the reduction of iron oxide with hydrogen or carbon monoxide in a cylindrical rotary kiln for producing spongy iron is mentioned.

A disadvantage will be, however, that the surface of the solid reaction component which is in contact with the gaseous reaction medium will be rather small and essentially limited to the upper layer of the solid material contents within the reaction apparatus.

In accordance with the invention, the solid reaction component in sufficiently finely pulverized form is kept in motion by the stream of the gaseous reaction component during the reaction time with addition of heat. The addition of heat to the reaction component will be preferably carried out by reacting suitable materials in an exothermic reaction in the reaction chamber.

This fundamental idea of the invention can be realised in different ways. A preferred form of realisation of the invention is that the solid reaction component will be in suspension in the stream of the gaseous reaction component during the reaction time so that the solid reaction component will essentially move in the same direction as the gaseous reaction component. For this form of realisation of the invention a comparatively fine pulverisation of the solid reaction component is of advantage.

When using a solid reaction component of a coarser grain it is possible to arrange the solid reaction component, during the reaction, on a perforated grate through which the gaseous reaction component will be introduced from below in such a way that the grains of the solid reaction component will be whirled up by the stream of the gaseous reaction component. The mass of the solid reaction component will bubble, so to speak, but without the solid reaction component being entrained as a whole by the gaseous reaction component.

The dust of the solid reaction component entrained by the gaseous reaction component in the latter case will be separated subsequently and, if any, fed back to the reaction chamber.

In the preferred form of realisation of the invention mentioned above in which the solid reaction component is in suspension with the gaseous reaction component during the reaction it will be of advantage to operate with a reaction chamber having an increased temperature in the middle of which a zone of highest temperature will be maintained, the solid reaction component being injected into the part of the reaction chamber surrounding the highest temperature zone by means of a stream of the gaseous reaction component which serves as a carrier. It is also possible to introduce into the wall zone of the reaction chamber, i. e. the part near the chamber wall, a preheated gaseous or vaporous medium which will form a practically closed envelope around the zone containing the mixture of solid and gaseous reaction components.

According to the invention the above mentioned middle zone of highest temperature can be formed advantageously by reacting a fuel with oxygen in an exothermic reaction in the middle of the reaction chamber where the zone of highest temperature is to be formed. The carbon can be applied in elementary form. For numerous reactions it is, however, more advantageous to apply the carbon in combined state, for instance in the form of hydrocarbons.

In the following specification and claims the term "oxygen" includes, unless otherwise specified, pure oxygen, oxygen-enriched air and gases or vapours containing a higher concentration of oxygen than is contained in air.

An essential field of application to which the invention particularly relates is the production of cyanides by the reaction of oxides and carbonates with nitrogen in a reducing atmosphere.

In order to generate cyanides in this way the invention will, on principle, apply the following mode of operation:

The carbonate, e. g. sodium carbonate, finely dispersed by means of a stream of hydrocarbon gas, e. g. coke oven or town gas, is injected into a reaction chamber having an increased temperature level. Insulation against loss of heat is provided by the suspension of gas and carbonate which surrounds a middle zone in which heat is produced. The mixture is then removed from the reaction chamber and cooled for separating the cyanide that has been formed. In the middle of the reaction chamber preheated air reacts with a suitable fuel (hydrocarbon gas and/or elementary carbon in a fine dispersion), by preference while a suitable gas, e. g. residual gas that has been freed from cyanides is conducted, preferably in preheated condition, into the wall zone of the reaction chamber. In certain circumstances it may be advantageous to inject the carbonate together with a suitable catalyst into the reaction chamber. It is also possible to feed elementary carbon together with the carbonate into the reaction chamber.

Figure 2:
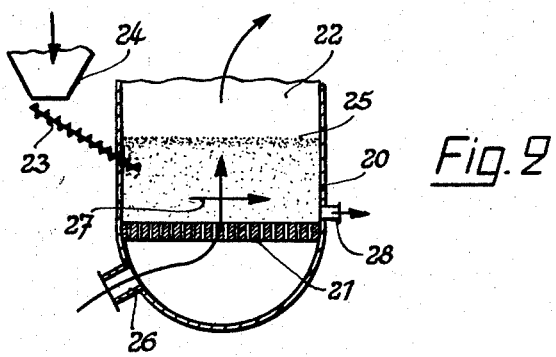
Figure 3:
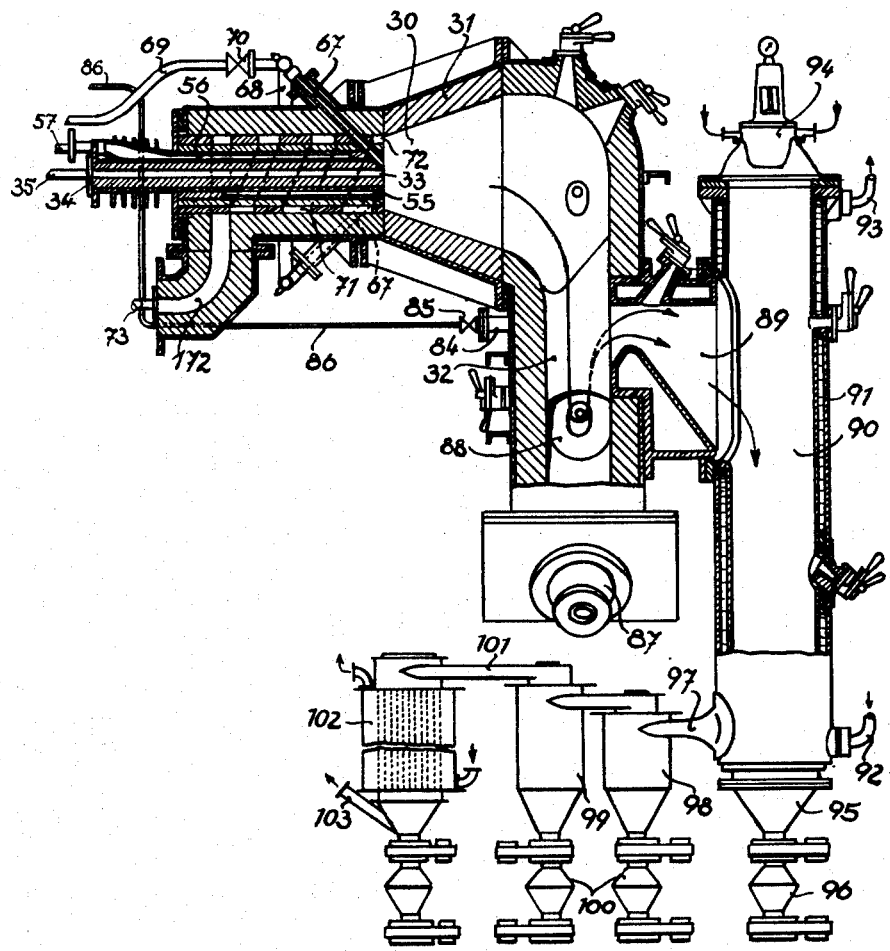
Figure 4:
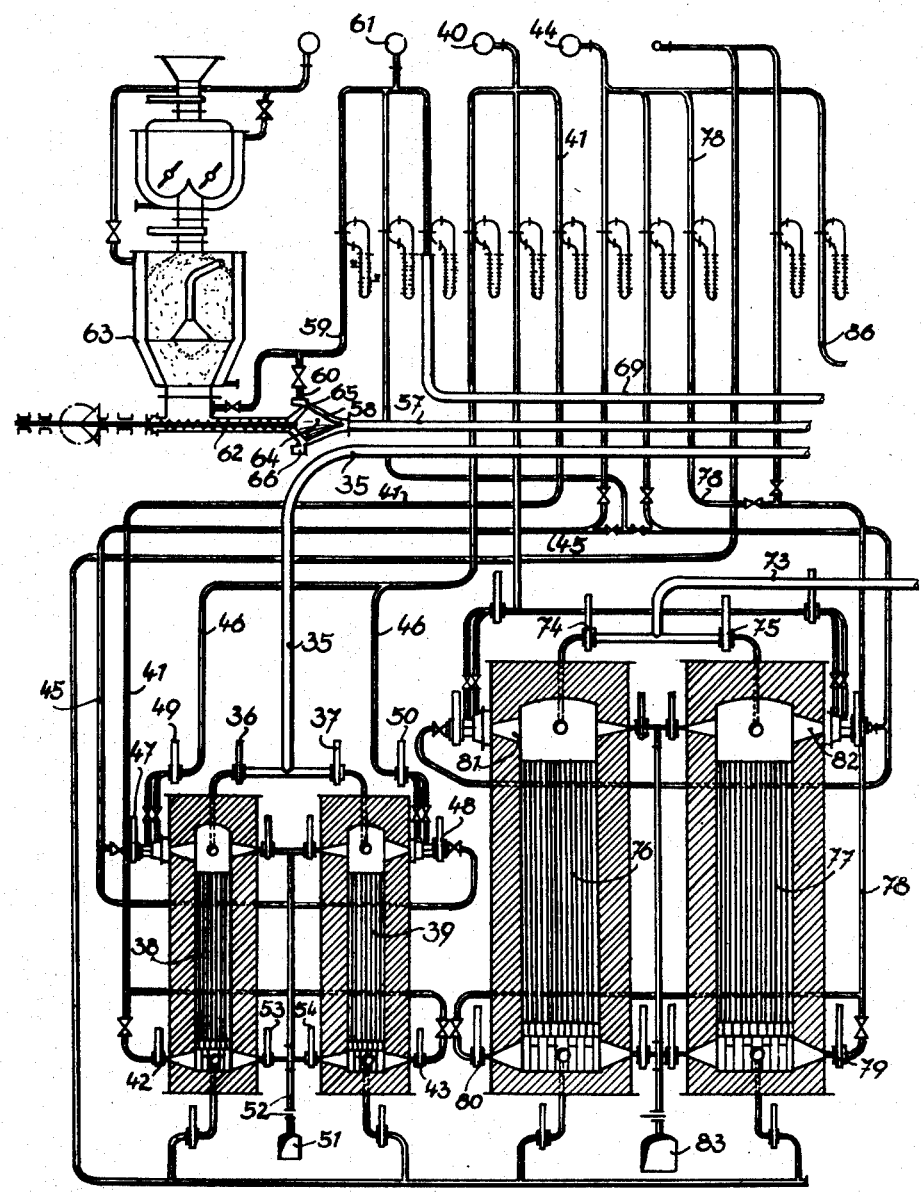

In the attached drawing:

Fig. 1 schematically shows a form of the process according to the invention,

Fig. 2 schematically shows another form of conducting an endothermic reaction,

Fig. 3 and Fig. 4 are finally a section and a view of an apparatus for realising the process as per Fig. 1.

In Fig. 1 the reaction chamber 1 is made of refractory brickwork 2 as an example. From the entrance 3 of the reaction components the reaction chamber 1 grows larger and is bent down near its end so that an outlet opening 4 for the reaction components and the residues of the reaction is formed.

A stream of hot air prepared in the air preheater 6 is injected into the middle of the reaction chamber 1 by the pipe line 5.

Around the air stream 5 a suspension of finely pulverized sodium carbonate and coke oven or city gas is injected by a series of circularly installed nozzles through the pipe lines 7. The finely pulverized sodium carbonate is taken from the storage hopper 8 and is fed by the conveyor screw 9 into an entrainment nozzle 10 to which the feed line 11 for coke oven gas is connected. In the entrainment nozzle 10 a highly homogeneous suspension of sodium carbonate and coke oven gas is formed which reaches the reaction chamber 1 through the pipe lines 7 and the subsequent nozzles at the speed required. Through a further series of inlet nozzles one or more streams of preheated residual gas from the preheater 12 is injected into the outer zone of the reaction chamber through the pipe line 13 in such a way that the residual gas stream advances spirally through the reaction chamber, as shown by the lines 14, surrounding the middle zone into which sodium carbonate, coke oven gas and air have been injected.

The reaction takes place in such a way that firstly the oxygen of the air injected through pipe line 5 reacts with part of the coke oven gas in an exothermic reaction.

By this reaction a very high temperature is generated in the middle of the reaction chamber resulting in the heating up of the gas masses surrounding the central zone to a correspondent temperature level. As the gas passing through the pipe lines 7 essentially consists of hydrocarbons a pyrogeneous decomposition of the hydrocarbons takes place if sufficiently heated and elementary carbon is generated. The carbon being here in statu nascendi reacts with high speed with the solid reaction component sodium carbonate. The resulting reaction products and the residual gases are drawn off finally through the opening 4.

The drain opening 4 is connected to a suitable apparatus specified below in order to separate the cyanides from the gases. The gas that then remains is called "residual gas" and is fed into the preheater 12 from which it is introduced into the reaction chamber 1 in a preheated state as shown above.

According to the process described the reaction may take place in the reaction chamber 1 probably as per the following equation:

$$Na_2CO_3 + N_2 = 2NaCN + 3CO$$

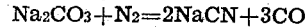

In this reaction it is advantageous to prevent the formation of water as far as possible in order to prevent saponification of the cyanides generated. Therefore it is of advantage to keep the water vapour contents of the gaseous components injected into the reaction chamber at the lowest possible level so that the final content of the reaction products of water vapour may be in no case so high that water may condense upon subsequent cooling.

Eventually it is possible to add a certain amount of elementary carbon finely pulverized to the sodium carbonate fed into the mixing nozzle 10 by the conveyor screw 9. It may also be useful to inject a certain amount of finely pulverized elementary carbon together with the preheated air into the reaction chamber through the pipe line 5. In the latter case a combustion of carbon will take place in the middle zone of the reaction chamber by which the desired high temperature is easily reached in this zone.

Fig. 2 shows another possibility of realising the invention.

The equipment used for this purpose essentially comprises a closed vessel 20 conveniently fitted with a heat insulation a grate 21 with numerous small openings being arranged in the lower part. The solid stuff to be treated is fed into the reaction chamber 22 by means of a screw 23 or in another suitable manner from the storage tank 24 in such a quantity that the layer is formed on the grate to about the level 25. Above the grate 21 an agitator (that may be watercooled) not shown on the drawing can be provided for in order to prevent an agglomeration of the solid reaction components during the reaction.

The apparatus as per Fig. 2 can be advantageously used for producing finely dispersed elementary iron, also called spongy iron, from iron oxide (ore) by reduction. For this purpose the ore is applied in a sufficiently fine grain size up to about 5 mm. This rather small sized material is fed into the reaction chamber 22 by means of the screw 23 continuously or by intervals. Then hot carbon monoxide or hot water vapour or a hot mixture of both is introduced out of the pipe line 26 from below through a grate 21 under such a pressure that the grained material on the grate 21 is set to move or bubble by the gas streams flowing through the grate perforations. The material on the grate 21 is strongly stirred by this movement and when looking at the layer during operation it seems as if the whole layer is boiling. The temperature of the gases penetrating through the grate 21 being advantageously made of refractory material is so graduated that the heat required for the reaction is at disposal in the layer of the solid reaction component on the grate. In case of production of iron powder or spongy iron from finely dispersed iron ore the temperature of the grained stuff should be, for instance, about 1050–1100° C. The temperature of the gases introduced through the grate must then be at a correspondently higher level in order to compensate loss of heat and to provide the reaction heat. In no case it should, however, be so high that the ore becomes pasty in which condition its particles tend to agglomerate.

The reaction chamber 22 can be made so that it is possible to operate continuously. In this case the material passes the reaction chamber in direction of arrow 27 and is drawn off continuously through an opening 28.

The reaction chamber is closed on its top in a suitable manner and fitted with an off-take through which it is possible to draw off the reduction gas spent. This gas often contains large amounts of dust which has been separated from the grained ore or been conveyed into the reaction chamber together with the ore. Therefore, it is advantageous to feed firstly the gas drawn off into a dust separator. The dust that has been separated there may be conveyed back to the reaction chamber if it still contains too much of unreduced ore.

The separation of the elementary finely dispersed iron from the gangue both contained in the reaction product drawn off through the opening 28 is realised in the conventional way.

The reducing gas may be heated in any way, e. g. in regenerators or recuperators. It is also possible to react part of the reducing gas or of another combustible gas with oxygen or air and to add the resulting hot combustion gases to the reducing gas so that a mixture of gases results that has the increased temperature required.

The reduction of iron ore for the purpose of producing iron powder or spongy iron can also be realised according to the process as per Fig. 1. In this case it is, however, of advantage to inject the iron ore together with a stream of cold or moderately preheated reducing gas into the reaction chamber 1 and to convey simultaneously a stream of oxygen or preheated air, and if necessary mixed with a gaseous, liquid, or finely pulverized solid fuel into the middle of the reaction chamber. From this results in the middle of the reaction chamber a zone with an increased temperature. From this zone the heat is transferred by radiation and convection to the mixture of finely pulverized ore and reducing gas in the zone of the reaction chamber that surrounds the middle zone, the said mixture being so brought to the temperature level necessary for the reaction.

Another example for how the invention may be realised is the production of sodium sulphate and hydrochloric acid from sodium chloride as per the equation $$2NaCl + SO_2 + O + H_2O = Na_2SO_4 + 2HCl$$

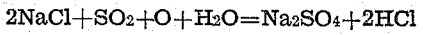

It may be mentioned that the solid reaction component in the process as per Fig. 1 must be more finely ground or dispersed than in the process as per Fig. 2. For realising the process as per Fig. 1 it is of special advantage to keep the portion of most finely pulverized dust as high as possible. By the high pulverisation of the solid stuff it is assured that the solid stuff does not separate from the gas masses before the reaction is finished. Simultaneously there results a very large surface of the solid reaction material, this accelerating very much the reaction with the gaseous reaction component with the effect that the reaction happens almost instantaneously and completely when the stuff passes the reaction chamber 1 only one time.

The equipment shown by Figs. 3 and 4 is mainly designed for producing cyanides. It comprises a reaction chamber 30 being made of refractory and non heat conducting brickwork 31. The reaction chamber 30 is tapered at its one end through which the reaction components enter. At the opposite end the chamber is shaped as a discharge channel 32 being vertically arranged. At the smaller end of the reaction chamber 30 having the form of a truncated cone a nozzle 33 enters centrally and co-axially the chamber 30, this nozzle being formed by a refractory pipe 34. The nozzle pipe 34 is connected to regenerators 38, 39 by means of pipe 35 fitted with check valves 36 and 37. These regenerators serve for preheating the air that is fed from the feed line 40 and that flows into the regenerators through pipe 41 fitted with check valves 42 and 43 near the entrance to the regenerators. For heating up the regenerators 38 and 39 fuel gas (residual gas) with air is burnt in the upper free space which is fed from the feed line 44 to which the regenerators are connected by pipe line 45. The combustion air is conveyed through pipes 46. The fuel gas mains are controlled by valves 47 and 48 and the combustion air lines are controlled by valves 49 and 50. At the lower end the regenerators are connected to the stack flue 51 by the pipe 52 controlled by valves 53 and 54.

For heating the regenerator 38 the valve 53 is opened first and then the valves 47 and 49. The hot gases produced in the top part of the regenerator 38 flow then down through the refractory chequer filling of the regenerator 38 and transfer their heat to the filling. As soon as the temperature of the regenerator has been brought to the desired level, the valves 47, 49, and 53 are closed, the air valve 42 and the valve 36 are opened. Then air can enter the regenerator 38 from below and reach the nozzle 33 by pipe line 35.

While the regenerator 38 is used for heating air, regenerator 39 is heated up by correspondent operation of valves 37, 50, 48, 43, and 54, so that when the regenerator 38 has grown cold the regenerator 39 is available for heating the reaction air. During the period the regenerator 39 serves for heating the air, the regenerator 38 is heated up.

The nozzle pipe 34 is surrounded by an annular channel 56 entering the reaction chamber 30 in form of an annular nozzle 55. This annular channel 56 is connected to a mixing and blowing equipment 58 by means of pipe line 57. City gas from the feed line 61 is fed under suitable pressure into the mixing equipment 58 through pipe line 59 and branch lines 60. Furthermore, the end of a conveyor screw 62 is connected to said mixing equipment 58, this screw conveying finely pulverized sodium carbonate in adequate quantity to said equipment 58 from the storage bin 63. The end of the conveyor screw 62 has the shape of a swivel 64 which rotates within the mixing equipment 58 forming an annular slot 65 through which the finely pulverized solid stuff that is conveyed by the screw 62 is pressed out. When leaving the annular slot 65 the finely pulverized solid stuff is caught by the stream of the city gas being under increased pressure. This stream reaches the annular channel 66 that surrounds the slot 65 through the pipe line 60. The channel 66 opens into the mixing equipment 58. This equipment effects an intimate mixing of the finely pulverised solid stuff with the city gas resulting in a practically homogeneous suspension. The mixture produced, having such a speed that it cannot separate out, reaches through pipe line 57 the annular channel 56 and through the nozzle 55 the reaction chamber 30.

As is seen, an annular stream of city gas in which a finely pulverized sodium carbonate is suspended surrounds a middle zone in the reaction chamber 30, this zone being formed by the stream of preheated air entering through the nozzle 30.

Several separate nozzles 67 enter the reaction chamber 30 between the nozzle 33 and the annular nozzle 55. The nozzles 67 are connected to the feed line 61 for city gas controlled by a regulating and check valve 70 through the distribution line 68 and the line 69.

This arrangement allows the introduction into the middle zone of reaction chamber 30 a fuel gas which reacts there with the preheated air in an exothermic reaction so as to form a zone of higher temperature in the middle of the reaction chamber. The temperature in this middle zone will be regulated by suitable adjustment of the valve 70 and of the temperature of the air entering through the nozzle 33 in such a way that the heat generated is high enough to heat up by radiation and convection to the necessary reaction temperature the suspension of city gas and finely pulverized sodium carbonate entering through the annular nozzle 55 and to assure a decomposition of the hydrocarbons entering the reaction chamber under formation of elementary carbon.

Instead of introducing a gaseous fuel through the nozzles 67 it is, in certain circumstances, also possible to apply a finely dispersed liquid fuel, e. g. fuel oil.

The annular channel 56 is surrounded by a screw lined channel 71 which discharges advantageously into the reaction chamber 30 in form of several oblique nozzles 72. This channel 71 is connected to the regenerators 76 and 77 serving to heat residual gas to high temperature, by means of feed channel 172 and pipe line 73 fitted with check valves 74 and 75. For this purpose, the regenerators 76 and 77 are connected to the feed line 44 for cooled residual gas by means of pipe line 78 controlled by check valves 79 and 80.

Furthermore, similar to the regenerators 38 and 39 means are provided in the upper part of the regenerators 76 and 77 for heating up the filling of the regenerators. These means consist of burners 81 and 82 to which fuel gas from line 44 and air are conveyed. On the other hand, the regenerators 76 and 77 are connected to the stack flue 83. When the regenerator 76 has been heated up it is possible to pass through it residual gas after opening the valve 80. This gas is fed into the line 73 by means of the opened valve 74 and from there into the feed channel 172. By the movement the gas stream is given when leaving the channel 172 and entering the reaction chamber results a helical gas movement along the surface of the reaction chamber under formation of a nearly closed gas envelope surrounding the middle zone of reaction. This screw lined movement of the gas is shown by a line 14 in Fig. 1. As soon as the regenerator 76 has been cooled down, the valves are reversed and the regenerator 77 is used for heating the residual gas.

The media produced during the reaction in the chamber 30 leave the chamber 30, as already mentioned, through the line 32. At the beginning of the outlet channel 32 a nozzle 84 is still provided for controlled by the valve 85 and connected to the feed line 44 for cooled residual gas by means of the pipe 86. This arrangement allows of adding to the hot media in the channel 32 an adequate amount of cold residual gas and lowering suddenly the temperature of the reaction media. This temperature drop causes a certain amount of reaction products to separate, they gather at the bottom of the channel in a vertical extension and may be drawn off by the equipment 87.

The other reaction media leave laterally through the opening 88, ascend a channel beside the channel 32 and from there they enter, through the connection 89, a cooling chamber 90 fitted with water jacket 91. The cooling water enters the water jacket at 92 and is drawn off at 93.

It is of advantage to expose the reaction media in the chamber 90 to the effect of ultra sonics generated in an apparatus 94. By this the finely dispersed solid stuffs in the rection media are caused to agglomerate more or less. Then the reaction media descend the chamber 90. The solid components therein separate in part into the bottom part 95 wherefrom they may be drawn off by means of the equipment 96. The reaction media finally leave the cooler 90 in a pre-cooled condition through the pipe 97 leading to the dust separator (cyclone) 98 followed by another cyclone. In this two cyclones 98 and 99 the rest of the recoverable solid stuffs is separated which then is drawn off by the equipment 100.

The residual gas eventually flows, through pipe 101, to a final cooler 102 where it is cooled down to a normal temperature level and drawn off through pipe 103 connected in a suitable manner to the feed line 44 for cold residual gas.

In the aforesaid specification, solid fuels (coal or the like) and gaseous fuels (fuel gas) are given as examples for the fuel that is applied in the process as per invention. It is, however, also possible to apply a fuel that is liquid in normal conditions as e. g. fuel oil. If such a liquid fuel is applied it should be advantageously finely dispersed or nebulized by means of a nebulizer or the like when entering the reaction chamber and treated in a similar way as the fuel oil of so-called oil burners.

If the kind of reaction performed requires that carbon reacts with another medium, e. g. in the case of formation of cyanides, it may be advantageous to apply the carbon in the most active form often called "in statu nascendi." This most active form of carbon results from decomposition of hydrocarbons. As an example of such a decomposition that of hydrocarbon gases or gases containing hydrocarbon has been mentioned. It is, however, possible to produce most active carbon by decomposition of liquid hydrocarbons, e. g. fuel oil. This means, as a rule, that large amounts of heat must be added very quickly to the hydrocarbon oil in finely dispersed or nebulized condition. This causes an instantaneous vaporisation and decomposition of the hydrocarbon oil. For this purpose, it is convenient to provide for a partial combustion of the hydrocarbon with oxygen or air having an increased oxygen content. It has been proved that such a partial combustion is able to develop large amounts of most active carbon within a rather small area, i. e. in a high concentration. In certain circumstances, the high concentration of the one reaction component permits reaching an efficient improvement of the conversion desired.

I claim:

1. A process for the production of cyanides by a reaction of finely divided solid carbonate with elementary nitrogen and carbon comprising, suspending said finely divided carbonate in a carrier gas at substantially normal temperature, injecting said suspension into a reaction chamber which is maintained at an increased temperature, contacting said carbonate while it is in suspension with elementary nitrogen present within the said reaction chamber, producing the heat required for the endothermic reaction between the carbonate, nitrogen and carbon by the combustion of a carbonaceous fuel with oxygen within the reaction chamber, injecting a preheated gaseous medium into the reaction chamber near the outer limits thereof to thereby provide an envelope within which the high temperature reactions are maintained, drawing off the reaction products and separating the cyanides so produced by cooling.

2. A process as recited in claim 1 in which the preheated gaseous medium is the by-product residual gas formed during the production of said cyanides.

3. A process as recited in claim 1 in which a finely divided catalyst material for said reaction is introduced in admixture with said finely divided carbonate.

4. A process as recited in claim 1 in which said reaction products drawn off from said reaction zone are cooled suddenly by admixing them with cold by-product residual gas.

5. A process as recited in claim 1 in which the carbonaceous fuel is supplied in the form of a combustible gas.

6. A process for the production of cyanides by a reaction of finely divided solid carbonate with elementary nitrogen and carbon comprising, suspending said finely divided carbonate in a carrier gas at substantially normal temperature, injecting said suspension into a reaction chamber which is maintained at an increased temperature, contacting said carbonate while it is in suspension with elementary nitrogen present within the said reaction chamber, producing the heat required for the endothermic reaction between the carbonate, nitrogen and carbon by the combustion of a carbonaceous fuel with oxygen within the reaction chamber, said combustion being confined within an elongated zone spaced from the outer peripheral limits of the chamber, said suspension being injected into said space to concentrically envelop said zone of combustion, drawing off the reaction products and separating the cyanides so produced by cooling.

7. A process as recited in claim 6 in which the reaction chamber is maintained at an increased temperature by the combustion of a carbonaceous fuel with air.

8. A process as recited in claim 7 in which the nitrogen necessary for the reaction is introduced with the air employed for the combustion of the carbonaceous fuel.

9. A process as recited in claim 8 in which the carbonaceous fuel is a hydrocarbon.

10. A process as recited in claim 9 in which the hydrocarbon is a gas under normal conditions of temperature and pressure.

11. A process as recited in claim 10 in which the carrier gas is a hydrocarbon and the suspension of the carbonate in the hydrocarbon is preheated prior to the introduction of the said suspension into the reaction chamber whereby elemental carbon is produced in situ.

12. A process for rapidly and continuously performing a high temperature endothermic reaction between a solid and a gaseous reactant which comprises suspending said solid in finely divided particulate form in a stream of said gaseous reactant, injecting said suspension into a reaction chamber which is maintained at an increased temperature, producing the heat required for the endothermic reaction by the combustion of a carbonaceous fuel with oxygen within the reaction chamber, said combustion being confined within an elongated zone spaced from the outer peripheral limits of the chamber, said suspension being injected into said space to concentrically envelop said zone of combustion to thereby permit said endothermic reaction to be performed rapidly and continuously while maintaining the walls which surround the said gas streams at a temperature substantially below the temperature of said combustion zone.

References Cited in the file of this patent

UNITED STATES PATENTS

| Number | Name | Date |
| --- | --- | --- |
| 1,352,192 | Hidden | Sept. 7, 1920 |
| 1,466,627 | McElroy | Aug. 28, 1923 |
| 2,344,007 | Totzek | Mar. 14, 1944 |
| 2,393,704 | Ogorzaly | Jan. 29, 1946 |
| 2,560,470 | Ogorzaly | July 10, 1951 |

FOREIGN PATENTS

| Number | Country | Date |
| --- | --- | --- |
| 94,114 | German | Sept. 8, 1897 |
| 310,686 | Great Britain | May 2, 1929 |